(12) United States Patent
Katou et al.

(10) Patent No.: US 9,744,749 B2
(45) Date of Patent: Aug. 29, 2017

(54) PLASTIC CONTAINER HAVING EXCELLENT DECORATIVE APPEARANCE

(71) Applicant: TOYO SEIKAN GROUP HOLDINGS, LTD., Shinagawa-ku, Tokyo (JP)

(72) Inventors: Yuuichirou Katou, Yokohama (JP); Kenjiro Tanaka, Yokohama (JP); Masayoshi Tanaka, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 316 days.

(21) Appl. No.: 14/391,140

(22) PCT Filed: Feb. 19, 2013

(86) PCT No.: PCT/JP2013/054020
§ 371 (c)(1),
(2) Date: Oct. 7, 2014

(87) PCT Pub. No.: WO2013/153855
PCT Pub. Date: Oct. 17, 2013

(65) Prior Publication Data
US 2015/0079320 A1    Mar. 19, 2015

(30) Foreign Application Priority Data

Apr. 10, 2012    (JP) ................... 2012-088889

(51) Int. Cl.
*B32B 37/00*    (2006.01)
*B32B 27/32*    (2006.01)
(Continued)

(52) U.S. Cl.
CPC ............... *B32B 27/32* (2013.01); *B32B 1/02* (2013.01); *B32B 3/04* (2013.01); *B32B 3/10* (2013.01);
(Continued)

(58) Field of Classification Search
CPC ......... B32B 27/08; B32B 27/20; B32B 27/32; B32B 27/36; B65D 1/0215; Y10T 428/1352
(Continued)

(56) References Cited

U.S. PATENT DOCUMENTS 6,294,251 B1 * 9/2001 Minagawa ................ B32B 7/12
428/352
7,357,967 B2    4/2008 Osika et al.
(Continued)

FOREIGN PATENT DOCUMENTS

| CN | 1276816 A | 12/2000 |
|----|-----------|---------|
| CN | 1984815 A | 6/2007 |

(Continued)

OTHER PUBLICATIONS

International Search Report for PCT/JP2013/054020 dated May 21, 2013 [PCT/ISA/210].
(Continued)

*Primary Examiner* — Ellen S Wood
(74) *Attorney, Agent, or Firm* — Sughrue Mion, PLLC

(57) ABSTRACT

A plastic container including a container body (1) made from a colored olefin resin and a decorative layer (3) laminated on the outer surface thereof. The decorative layer includes a transparent adhesive resin layer (3b), a transparent polyester resin layer (3a) which is the outer surface layer, and an intermediate gradation layer (3c) including a portion of which the thickness gradually varies in the direction of height of the container. The gradation layer is formed of a transparent polyester resin blended with a coloring agent. The thickness of the container body varies in response to a change in the thickness of the gradation layer in a manner such that the thickness of the container body portion which is the total thickness of the thickness of the container body
(Continued)

and the thickness of the decorative layer is not varied by the presence of the gradation layer.

3 Claims, 1 Drawing Sheet

(51) Int. Cl.
*B65D 25/34* (2006.01)
*B32B 3/10* (2006.01)
*B32B 27/08* (2006.01)
*B32B 27/36* (2006.01)
*B32B 1/02* (2006.01)
*B65D 23/08* (2006.01)
*B32B 7/12* (2006.01)
*B32B 3/04* (2006.01)
*B32B 27/18* (2006.01)
*B32B 3/26* (2006.01)
*B32B 7/02* (2006.01)
*B29C 47/00* (2006.01)
*B29C 47/06* (2006.01)
*B29C 49/04* (2006.01)
*B29C 49/22* (2006.01)

(52) U.S. Cl.
CPC ............... *B32B 3/263* (2013.01); *B32B 7/02* (2013.01); *B32B 7/12* (2013.01); *B32B 27/08* (2013.01); *B32B 27/18* (2013.01); *B32B 27/36* (2013.01); *B65D 23/0821* (2013.01); *B65D 25/34* (2013.01); *B29C 47/0023* (2013.01); *B29C 47/0033* (2013.01); *B29C 47/0054* (2013.01); *B29C 47/065* (2013.01); *B29C 49/04* (2013.01); *B29C 49/22* (2013.01); *B29C 2049/228* (2013.01); *B32B 2250/03* (2013.01); *B32B 2250/24* (2013.01); *B32B 2272/00* (2013.01); *B32B 2274/00* (2013.01); *B32B 2307/402* (2013.01); *B32B 2307/406* (2013.01); *B32B 2307/4026* (2013.01); *B32B 2307/412* (2013.01); *B32B 2307/50* (2013.01); *B32B 2439/00* (2013.01); *B32B 2439/60* (2013.01); *B32B 2451/00* (2013.01); *Y10T 428/1352* (2015.01)

(58) Field of Classification Search
USPC .................................................. 428/34.7, 35.1
See application file for complete search history.

(56) References Cited

U.S. PATENT DOCUMENTS

| 8,097,317 | B2 | 1/2012 | Katou et al. |
| 2005/0287323 | A1 | 12/2005 | Akiyama et al. |
| 2007/0042145 | A1* | 2/2007 | Ohta ................ B32B 25/08 428/34.5 |
| 2007/0228598 | A1 | 10/2007 | Akiyama et al. |
| 2008/0063823 | A1 | 3/2008 | Tanaka et al. |
| 2009/0155504 | A1 | 6/2009 | Akiyama et al. |
| 2009/0233026 | A1 | 9/2009 | Akiyama et al. |
| 2010/0291332 | A1 | 11/2010 | Akiyama et al. |
| 2012/0256356 | A1 | 10/2012 | Akiyama et al. |

FOREIGN PATENT DOCUMENTS

| EP | 1023395 B1 | 9/2007 |
| JP | 6-106606 A | 4/1994 |
| JP | 2005-342900 A | 12/2005 |
| JP | 4391887 B2 | 12/2009 |
| JP | 2012-62121 A | 3/2012 |
| WO | 2004/022307 A1 | 3/2004 |
| WO | 2008/090655 A1 | 7/2008 |

OTHER PUBLICATIONS

Communication dated Mar. 12, 2015 from the State Intellectual Property Office of the People's Republic of China in counterpart application No. 201380019473.X.

* cited by examiner

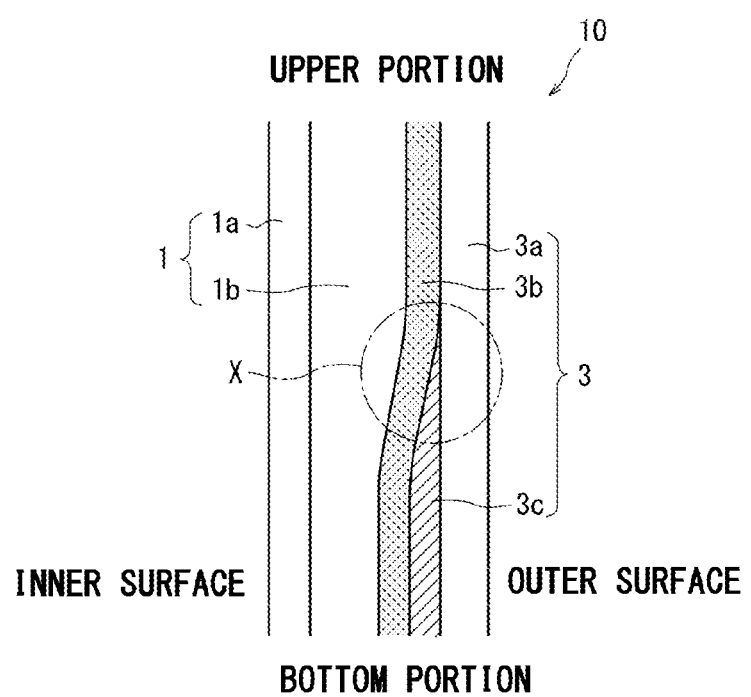

PLASTIC CONTAINER HAVING EXCELLENT DECORATIVE APPEARANCE

CROSS REFERENCE TO RELATED APPLICATIONS

This application is a National Stage of International Application No. PCT/JP2013/054020, filed on Feb. 19, 2013, which claims priority from Japanese Patent Application No. 2012-088889, filed on Apr. 10, 2012, the contents of all of which are incorporated herein by reference in their entirety.

TECHNICAL FIELD

This invention relates to a plastic container having excellent decorative appearance and, more specifically, to a plastic container having a gradation layer provided in a decorative layer that is formed on the outer surface of the container body.

BACKGROUND ART

Olefin resins such as polyethylene and polypropylene can be favorably formed and are inexpensive materials finding a wide range of use as packing containers. In the field of containers, therefore, it has been desired to improve their commercial value upon improving their appearance.

As for the olefin resin containers, for example, a patent document 1 is proposing a container that has a highly transparent polyester resin layer featuring a very smooth surface provided, via an adhesive resin layer, on the surface of the container body made from an olefin resin. The container exhibits excellent luster and has a high commercial value without, however, paying attention to attaining gradating decoration that permits pattern to vary gradually and, therefore, still leaving room for improvements in regard to appearance of the container.

A patent document 2, on the other hand, is proposing an art of providing the outer surface of a container body with a decorative layer comprising a bright film and a colored film formed on the bright film and, further, forming a lustrous layer on the decorative layer. In this container, both the colored film and the bright film are gradated so that their thicknesses vary gradually in the direction of height. Namely, the thickness of the colored film gradually increases over the portion where the thickness of the bright film gradually decreases and the overall thickness of the container body portion is maintained unchanged.

PRIOR ART DOCUMENTS

Patent Documents

Patent document 1: WO2008/090655
Patent document 2: Japanese Patent No. 4391887

OUTLINE OF THE INVENTION

Problems that the Invention is to Solve

The container of the patent document 2 has not only the lustrous outer surface but also the gradating decoration, and has very improved commercial value.

However, the container of the patent document 2, too, still has a problem that must be improved. That is, in order to avoid a change in the thickness of the container due to gradation, the thin decorative layer is formed in two layers, i.e., colored film and bright film which are facing each other and are both gradating. This, however, involves a great difficulty for forming them and arouses a problem such as dispersion in the design and pattern due to the gradation layer.

In the container of the patent document 2, further, when the container body is formed by using an olefin resin and the outermost lustrous surface is formed by using a polyester resin such as polyethylene terephthalate (PET) or the like, an adhesive resin layer must be formed between the decorative layer and the container body since adhesiveness is poor between the olefin resin and the polyester resin. Here, if the thickness of the adhesive resin layer varies accompanying a change in the thickness of the gradated decorative layer, the strength of adhesion does not remain constant between the gradated decorative layer and the container body, and the gradated decorative layer tends to be easily peeled off.

It is, therefore, an object of the present invention to provide a plastic container forming a gradation layer that includes a portion of which the thickness gradually varies on the outer surface of a container body made from an olefin resin and forming a transparent polyester resin layer on the outermost surface, yet effectively preventing the gradation layer from peeling and featuring excellent decorative appearance enabling the gradating decoration to be exhibited maintaining precision and stability free of dispersion.

Means for Solving the Problems

According to the present invention, there is provided a plastic container comprising a container body made from an olefin resin and is colored and a decorative layer formed on the outer surface of the container body, wherein the decorative layer includes a transparent adhesive resin layer positioned on the inner surface side of the container, a transparent polyester resin layer which is the outer surface layer positioned on the outer surface side of the container, and a gradation layer which is formed between the transparent adhesive resin layer and the transparent polyester resin layer and includes a portion of which the thickness gradually varies in the direction of height of the container, the gradation layer being formed of a resin composition of a transparent polyester resin blended with a coloring agent;

the thickness of the container body in the container body portion varying in response to a change in the thickness of the gradation layer in a manner that the thickness of the container body portion which is the total thickness of the thickness of the container body and the thickness of the decorative layer is not varied by the presence of the gradation layer.

In the plastic container of the present invention, it is desired that:

(1) The gradation layer is formed by using a transparent polyester resin having a water content smaller than that of a transparent polyester resin that is forming the outer surface layer;

(2) The outer surface layer is formed by using the transparent polyester resin having a water content of 500 to 1500 ppm, and the gradation layer is formed by using the transparent polyester resin having a water content of 50 to 500 ppm; and (3) The container body includes an uncolored or colored layer of a virgin olefin resin, and a colored reproduced layer formed by using scraps that generates at the time of forming the container being blended with an olefin resin and a coloring agent, the thickness of the colored reproduced layer varying responsive to a change in the thickness of the gradation layer.

It is, further, desired that the above plastic container is a bottle obtained by the direct blow-forming.

Effects of the Invention

In the present invention, an important feature resides in that a change in the thickness of the gradation layer in the decorative layer is adjusted depending on a change in the thickness of the container body.

That is, in a portion of the container body portion where the thickness of the gradation layer gradually varies, the thickness of the body portion of the container body varies responsive to the change in the thickness of the gradation layer, and the thickness of the container body portion as a whole (total thickness of the thickness of the body portion of the container body and the thickness of the decorative layer) is maintained constant. It will, therefore, be learned that in the container of the present invention, the thickness of the transparent adhesive resin layer is maintained constant. Therefore, even in a portion where the thickness of the gradation layer varies, a predetermined strength of adhesion can be maintained between the decorative layer and the container body effectively preventing the decorative layer from peeling.

In the container of the invention, further, the container body is formed by using the olefin resin and is colored by being blended with a coloring agent, and a gradating decoration is expressed by the color of the container body in combination with the color of the gradation layer. That is, in the portion where the gradation layer is present, the color of the gradation layer can be observed from the exterior. As the thickness of the gradation layer gradually decreases, however, the color of the container body gradually appears to be observed from the exterior and, as a result, the gradating decoration is expressed. Here, a transparent adhesive resin layer is interposed between the container body and the gradation layer that contribute to the gradating decoration; i.e., the two are not in direct contact with each other and, besides, the thickness of the container body is considerably larger than the thickness of the gradation layer. As a result, the container body is so thick that its color tone remains stable, and the gradating decoration is affected very little even if the thickness of the container body is varied to some extent responsive to a change in the thickness of the gradation layer. For instance, if the two gradation layers are directly facing each other yet having small thicknesses, a change in the thickness of the one layer causes a change in the thickness of the other layer, and a change in the thickness would greatly affect the gradating decoration. The present invention, however, effectively avoids such an inconvenience.

In the present invention, further, it is desired that the gradation layer (hereinafter often called G-layer) is formed by using a transparent polyester resin having a water content smaller than that of a transparent polyester resin forming the outer surface layer.

That is, the container is produced by forming, by co-extrusion, a preform that has the layer structure of the container, and by putting the preform to a secondary forming. At the time of co-extrusion in this case, the amount of the transparent polyester resin for forming the G-layer that is being extruded is gradually squeezed by operating, for example, a gear pump and, finally, the feeding thereof by the gear pump is discontinued. However, the polyester resin has a low melt viscosity since it has a large water content. Therefore, if the transparent polyester resin for forming the G-layer has a water content that is larger than a water content of the polyester resin forming the outer surface layer that comes in contact therewith, then the polyester resin flows through the gear pump despite it is no longer fed by the gear pump, and infiltrates into between the outer surface layer and the transparent adhesive resin layer. After all, the gradation layer locally extends unnecessarily, or forms a pattern like isolated lands. Besides, local shading or oozing tends to develop in the gradating decoration.

Upon using the transparent polyester resin for forming the gradation layer that has a water content smaller than that of the transparent polyester resin forming the outer surface layer, however, it is allowed to suppress the fluidity, to increase the fluidity of the transparent polyester resin for forming the outer layer, and to effectively suppress the resin from flowing into between the outer surface layer and the transparent adhesive resin layer after the gradation layer has no longer been extruded. Thus it is allowed to express a more vivid gradating decoration maintaining stability.

Here, the water content of the polyester resin is measured by the Karl Fischer's method as also described in Examples appearing later.

In the plastic container of the invention, further, the outer surface layer is formed by using the transparent polyester resin having improved smoothness on the surface thereof and, therefore, imparting luster and further improved decorative appearance.

BRIEF DESCRIPTION OF THE DRAWING

FIG. 1 is a sectional view showing the layer structure in the body portion of a plastic container of the present invention.

MODE FOR CARRYING OUT THE INVENTION

Referring to FIG. 1 showing the layer structure in the body portion of a plastic container of the present invention, the container 10 comprises a container body 1 made from an olefin resin and is colored by being blended with a coloring agent and a decorative layer 3 formed on the outer surface of the container body 1. The decorative layer 3 includes a transparent outer surface layer 3a and a transparent adhesive resin layer 3b. A gradation layer 3c is formed between the outer surface layer 3a and the transparent adhesive resin layer 3b. Namely, the gradation layer 3c is a colored layer and includes a region X where the thickness thereof gradually changes. As shown in FIG. 1, the container 10 has in the body portion thereof the region X where the thickness of the gradation layer 3c decreases gradually and where the color of the container body 1 and the color of the gradation layer 3c are reflected on the exterior of the body portion via the transparent outer surface layer 3a to express gradating decoration.

<Container Body 1>

The container body 1 is formed by using an olefin resin and is colored by being blended with a coloring agent. Namely, the container body 1 uses the olefin resin as a base resin and can be favorably produced owing to properties specific to the olefin resin.

As the olefin resin used as the base resin of the container body 1, there can be used the known ones such as low-density polyethylene, linear low-density polyethylene, intermediate-density polyethylene, high-density polyethylene, polypropylene and polymers of other α-olefins, as well as olefin copolymer like copolymers of various olefins, propylene-ethylene copolymer, ethylene-vinyl acetate copolymer, and olefin resin graft-modified with an ethylenically unsaturated carboxylic acid or an anhydride thereof, which may be used in one kind or in a blend of two or more kinds. The base resin of the container body is selected from suitable olefin resins depending on the use of the container 10. For the container like, for example, a squeezed bottle, the low-density polyethylene or the like is preferably used as the base resin.

Further, the olefin resin used for forming the container body has a melt flow rate (MFR; JIS K7210; 190° C., load of 2.16 Kg) of, usually, in a range of 0.1 to 30 g/10 min.

As the coloring agent used for imparting color, there can be used organic pigments such as azo pigment, phthalocyanine pigment, condensed polycyclic pigment and dye lake pigment, as well as bright pigments such as aluminum bright pigment like polarized pearl pigment, mica bright pigment, and glass bright pigment. One or two or more kinds of pigments of suitable colors may be used depending on a desired appearance design (gradating decoration, etc.) of the container. It is allowable to add a body such as calcium carbonate to adjust hue and physical properties, as a matter of course. These coloring agents are added in such amounts that will not impair formability of the olefin resin or various properties and that the appearance of the container 10 can be designed as desired.

When there are used various bright pigments of the type of aluminum, mica or glass as the coloring agents, there can be advantageously imparted, specifically, metallic luster.

The container body 1 may be, either, opaque or transparent so far as the color that is imparted is reflected to create appearance, and may, further, be formed of a plurality of layers and of which any layer may be blended with the coloring agent, and may include, for example, a colored layer blended with the coloring agent and a non-colored layer which is not blended with the coloring agent. Further, a gas-barrier resin layer comprising an ethylene-vinyl alcohol copolymer or the like may be formed between them via suitable adhesive layers. It is desired that the gas-barrier resin layer and the adhesive layer are transparent and do not impair the color of the container body 1.

From the standpoint of saving resources and lowering the cost, it is desired in the invention a colored reproduced layer is formed by utilizing chips and scraps that are generated during the forming of the containers. Referring to FIG. 1, for example, the container body 1 includes the layer 1a of a virgin olefin resin formed on the inner surface side of the container and the layer 1b which is the colored reproduced layer formed on the outer surface side of the container body 1, the colored reproduced layer being formed by using chips and scraps recovered in the step of forming the containers. Namely, the colored reproduced layer 1b is a colored layer (colored reproduced layer) formed by using a resin composition comprising scraps generated at the time of forming the containers being blended with the virgin olefin resin and the coloring agent. The coloring agent is added in addition to the coloring agent contained in the scraps so as to attain a predetermined density of the coloring agent.

The colored reproduced layer 1b is used in amounts in a range in which it does not adversely affect the properties of the virgin layer 1a. Usually, the thickness of the colored reproduced layer 1b is not more than 90% of the thickness of the container body 1.

The virgin layer 1a may be colored by being blended with the coloring agent or may not be colored without being blended with any coloring agent. Usually, however, the virgin layer 1a is uncolored to acquire an increased pinching strength.

In the invention as shown in FIG. 1, a change in the thickness of the gradation layer 3c is adjusted depending on a change in the thickness of the container body 1. It is, therefore, allowed to maintain constant the thickness of the body portion of the container 10 without changing the thickness of other layers (specifically, transparent adhesive resin layer 3b). When the colored reproduced layer 1b is formed as shown in FIG. 1, in particular, it is desired to maintain the thickness of the virgin layer 1a constant while changing the thickness of the colored reproduced layer 1b depending on a change in the thickness of the gradation layer 3c.

To maintain the thickness of the body portion of the container 10 constant, usually, means that a difference between a maximum thickness and a minimum thickness of the side wall of the container 10 lies in a range of not more than 70% of the maximum thickness.

<Decorative Layer 3>

The decorative layer 3 includes an outer surface layer 3a of a transparent polyester resin, a transparent adhesive resin layer 3b for adhering and fixing the decorative layer 3 to the container body 1, and a gradation layer 3c arranged between the above layers.

The decorative layer 3 is formed maintaining a thickness in a range in which it does not impair basic properties of the container body 1 that is formed by using the olefin resin as the base resin. Usually, the thickness of the decorative layer 3 should be maintained in a range of not more than 50% and, specifically, not more than 35% of the thickness of the body portion of the container which is the total thickness of the container body 1 and the decorative layer 3. Within its range, the thickness of the decorative layer 3 and the thickness of the container body 1 may be increased or decreased depending on the presence of the gradation layer 3c or on a change in the thickness thereof.

Outer Surface Layer 3a:

The polyester resin forming the outer surface layer 3a must be transparent so as to reflect the colors of the container body 1 and the gradation layer 3c. From the standpoint of formability into the container, however, there are usually used thermoplastic polyesters such as polyethylene terephthalate, polybutylene terephthalate and polynaphthalene terephthalate and among them, the polyethylene terephthalate (PET) is favorably used.

In the invention, from the standpoint of transparency and flexibility, it is desired to use an amorphous polyester such as the one in which copolyester units have been introduced in small amounts in the ethylene terephthalate unit. As the copolymerizable component for forming the copolyester, there can be exemplified dicarboxylic acid components such as isophthalic acid, p-β-oxyethoxybenzoic acid, naphthalene 2,6-dicarboxylic acid, diphenoxyethane-4,4'-dicarboxylic acid, 5-sodium sulfoisophthalic acid, adipic acid, sebacic acid and alkyl ester derivatives thereof; and glycol components such as propylene glycol, 1,4-butanediol, neopentyl glycol, 1,6-hexylene glycol, cyclohexanedimethanol, ethylene oxide adduct of bisphenol A, diethylene glycol and triethylene glycol.

By taking into consideration the fact that the container of the invention is produced by being laminated with the above-mentioned olefin resin through co-extrusion, it is desired that the polyester forming the outer surface layer 3a has an intrinsic viscosity [η] of not less than 0.5 (dl/g) and, specifically, not less than 0.6 (dl/g) and, further, has a water content that affects fluidity and that is adjusted to be 500 to 1500 ppm and, specifically, about 600 to 900 ppm. If the water content is large, foaming easily occurs in the outer surface layer 3a to impair luster. If the water content becomes small, the melt viscosity increases at the time of forming the outer surface layer 3a by melt-extrusion causing the fluidity to decrease and, therefore, causing the surface of the polyester resin layer to become rough which is the so-called shark skin.

It is further desired that the outer surface layer 3a has its surface smoothed by adding a lubricating agent or the like so far as the transparency thereof is not impaired and the colors of the container body 1 and the gradation layer 3c are reflected to create appearance. It is desired that the average surface roughness Ra (JIS B-6010) has been adjusted to be, for example, not more than 0.2 μm. The luster can be imparted by increasing the surface smoothness. It is, further, allowable to suitably add thermoplastic elastomer, other thermoplastic resins, rubber resin, inorganic filler, pigment, plasticizer, antioxidant, antistatic agent, photo stabilizer, anti-blocking agent, lubricant, dye and the like in small amount with which it will not impair the transparency and formability.

It is desired that the thickness of the above-mentioned outer surface layer 3a lies, usually, in a range of about 20 to about 500 μm on condition that the thickness of the decorative layer 3 satisfies the above-mentioned range though the thickness of the outer surface layer 3a may vary depending on the use and form of the container.

Transparent Adhesive Resin Layer 3b:

The polyester resin forming the outer surface layer 3a adheres poorly to the olefin resin which is the base resin of the container body 1 and, therefore, needs the provision of the transparent adhesive resin layer 3b. In the present invention, however, the color of the container body 1 must be reflected to the exterior for attaining gradating decoration. Therefore, the transparent adhesive resin layer 3b, too, must be transparent.

As the transparent adhesive resin for forming the layer 3b, there can be used a known resin that adheres to both the polyester resin and the olefin resin. For example, there can be used an ethylene α-olefin copolymer resin and acid-modified resins thereof, acid-modified resin of olefin resin, and glycidyl group-containing resin in one kind or in a blend of two or more kinds.

The ethylene and the α-olefin may be copolymerized in any form such as random, block or graft. Further, the acid-modification is, usually, a graft-modification with an unsaturated carboxylic acid such as acrylic acid, methacrylic acid, maleic acid, fumaric acid, itaconic acid or crotonic acid, or with an anhydride thereof.

It is, further, allowable to form the transparent adhesive resin layer 3b by using an olefin resin such as low-density polyethylene blended with a tackifier. As the tackiness-imparting agent, there can be exemplified a rosin resin, a terpene resin or a petroleum resin which may be added in one kind or in two or more kinds to the transparent adhesive resin layer 3b.

It is allowable, as a matter of course, to improve the adhering force by adding the above tackiness-imparting agent to the above-mentioned known resin that adheres to both the polyester resin and the olefin resin.

It is, further, allowable to blend the transparent adhesive resin layer 3b with a variety of additives known per se. such as thermoplastic elastomer, other thermoplastic resins, rubber resin, inorganic filler, pigment, plasticizer, antioxidant, antistatic agent, photo stabilizer and anti-blocking agent so far as they do not impair the transparency, adhesiveness or reflection of color of the container body 1 to the exterior.

It may happen that fine ruggedness occurs in the junction interface between the transparent adhesive resin layer 3b and the outer surface layer 3a, container body 1 or the gradation layer 3c that will be described later, and the ruggedness may be reflected on the appearance of the container 10 to impair the desired gradating decoration. To prevent the occurrence of such fine ruggedness, there may be added a lubricating agent in a very small amount with which it will not impair the adhesiveness of the layer 3b, e.g., in an amount of about 0.01 to about 0.5% by weight and, specifically, about 0.02 to about 0.1% by weight.

As the lubricating agent, there can be exemplified those that have heretofore been known, such as:

(a) Those of the hydrocarbon type, such as fluidized, natural or synthetic paraffin, micro wax, polyethylene wax and chlorinated polyethylene wax;

(b) Those of the fatty acid type, such as stearic acid and lauric acid;

(c) Those of the aliphatic amide type, such as stearic acid amide, palmitic acid amide, oleic acid amide, erucic acid amide, methylenebisstearo amide, and ethylenebisstearo amide;

(d) Those of the fatty acid ester type, such as butyl stearate, cured castor oil, and ethylene glycol monostearate;

(e) Those of the alcohol type, such as cetyl alcohol and stearyl alcohol;

(f) Metal soaps such as zinc stearate and calcium stearate;

(g) Polyorganosiloxane; and (h) Polymer powders of the fluorine type, such as polytetrafluoroethylene, tetrafluoroethylene-vinylidene floride-hexafluoropropylene tercopolymer, and a polymer having a fluoroalkyl group at both terminals or at one terminal thereof, which may be used in a single kind or in a mixture of two or more kinds. It is desired that the lubricating agent has been dispersed having particle sizes of about 0.5 to about 40 μm depending on the thickness of the layer 3b, and, particularly desirably, it is of the fluorine-contained type.

By taking the formability into consideration, it is desired that the resin composition for forming the transparent adhesive resin layer 3b which is the above transparent adhesive resin to which various kinds of additives are suitably added, has a melt flow rate (MFR; JIS K 7210; 190° C., load of 2.16 Kg) in a range of 0.1 to 10.0 g/10 min.

Further, though dependent upon the thickness of the outer surface layer 3a and of the gradation layer 3c interposed between the transparent adhesive resin layer 3b and the outer surface layer 3a, it is desired that the thickness of the transparent adhesive resin layer 3b has a thickness, usually, in a range of about 10 to about 500 μm on condition that the thickness of the decorative layer 3 is in the above-mentioned range.

Gradation Layer 3c:

In the decorative layer 3 of the present invention as shown in FIG. 1, the gradation layer 3c is provided between the outer surface layer (transparent polyester resin layer) 3a and the transparent adhesive resin layer 3b. Namely, in the body portion of the container 10, the thickness of the gradation layer 3c gradually varies in the direction of height thereof. In FIG. 1, for instance, the thickness of the gradation layer 3c gradually decreases toward the upper side and becomes, finally, zero. Conversely, it is allowable, as a matter of course, to so design that the thickness of the gradation layer 3c gradually decreases downwards. In this case, no gradation layer 3c is present in the bottom portion of the container.

That is, the color of the container body 1 is shut off by the gradation layer 3c; i.e., as the thickness of the gradation layer 3c gradually decreases, the color of the container body 1 gradually appears. Namely, the color of the gradation layer 3c changes into the color of the container body 1 without through the boundary portion and creating a gradating decoration.

Therefore, the gradation layer 3c is a layer comprising a transparent polyester resin to which a coloring agent is added.

As also described concerning the container body 1, the coloring agent may be a known pigment and is used depending on the desired pattern or design. The layer 3c, however, must form a portion where the thickness gradually decreases. By taking the formability into consideration, therefore, the amount of the coloring agent is, desirably, in a range of not more than 30% by weight per the transparent polyester resin. If the amount of addition is large, it becomes difficult to gradually decrease the thickness of the gradation layer 3c, or ruggedness is formed in the interface between the gradation layer 3c and the outer surface layer 3a or the transparent adhesive resin layer 3b, and may be reflected on the appearance to impair the gradating decoration.

In the invention, further, the base resin used for forming the gradation layer 3c is the one having the same properties as those of the transparent polyester resin forming the outer surface layer 3a from the standpoint of adhesiveness to the outer surface layer 3a. Preferably, however, the base resin forming the gradation layer 3c is a transparent polyester resin having a water content smaller than that of the transparent polyester resin forming the outer surface layer 3a, and, most desirably, is the transparent polyester resin having a water content of 50 to 500 ppm and, specifically, 100 to 300 ppm. That is, as described earlier, the transparent polyester resin having a small water content is highly viscous as compared to the one having a large water content, and makes it possible to effectively control the fluidity of the polyester resin for forming the gradation layer 3c during the co-extrusion. Concretely, if the above range is exceeded, the gradation layer 3c becomes unnecessarily long and infiltrates into between the outer surface layer 3a and the transparent adhesive resin layer 3b; i.e., the gradation layer 3c extends or forms isolated portions to exhibit defective appearance. If the water content is smaller than the above range, an extended period of time is required for drying the resin before it is injected, and the productivity decreases.

The degree of change in the thickness of the thickness-varying region X of the gradation layer 3c is set to lie in a suitable range depending on a desired degree of gradating decoration or on the color of the container body 1. From the standpoint of formability, however, it is desired to so design the gradating decoration that the degree of change in the thickness, i.e., the amount of decrease or increase in the thickness is about 0.1 to about 3.0 µm per a distance of 1 mm in the direction of height of the container 10.

Further, the thickness in the portion where there is no change in the thickness (i.e., a maximum thickness) is in a range of about 20 to 500 µm on condition that the thickness of the decorative layer 3 is in the above-mentioned range.

Further, the gradation layer 3c, too, may be suitably blended with a variety of kinds of additives known per se., such as thermoplastic elastomer, other thermoplastic resins, rubber resin, inorganic filler, pigment, plasticizer, antioxidant, antistatic agent, photo stabilizer and anti-blocking agent so far as they do not adversely affect the gradating decoration.

<Production of the Containers>

The plastic container of the invention having the above-mentioned layer structure is produced by forming a preform for container by co-extruding resin materials corresponding to the container body 1 and the decorative layer 3 (outer surface layer 3a, transparent adhesive resin layer 3b and gradation layer 3c), and forming the preform into the shape of a container through the secondary forming such as blow-forming or plug assist forming. In conducting the co-extrusion, the amounts of extrusion are adjusted by using, for example, gear pumps. In a portion that becomes the thickness-varying region X of the gradation layer 3c, the amount of extrusion of the resin material for the gradation layer 3c is gradually squeezed while the amount of extrusion of the resin material for the container body 1 (specifically, colored reproduced layer 1b) is gradually increased in response thereto. The amounts of extrusion for other layers (e.g., virgin layer 1a, outer surface layer 3a, transparent adhesive resin layer 3b) are maintained the same. Thus, there is formed the thickness-varying region X of the gradation layer 3c. Here, as the base resin of the gradation layer 3c, there is used the transparent polyester resin (specifically, the one having a water content of 50 to 500 ppm) of which the water content is smaller than the water content of the base resin of the outer surface layer 3a to form the thickness-varying region X of the gradation layer 3c maintaining precision.

In forming the container, further, it is desired that the forming mold (e.g., blow mold) for defining the outer surface of the container has a surface roughness Ra that is set to be about 0.2 to about 0.8 µm from the standpoint of smoothing the surface of the outer surface layer 3a of the container as described above and realizing excellent luster of the container.

The resin materials for forming the outer surface layer 3a and the gradation layer 3c are, usually, heated and dried at about 50 to 80° C. in their pelletized state of before being melt-formed to acquire a predetermined water content.

From the standpoint of utilizing the properties of the olefin resin forming the container-body 1, further, it is desired that the present invention is applied to producing, specifically, directly blow-formed bottles. That is, the bottles of this kid are formed by forming a preform of the shape of a pipe by the above-mentioned co-extrusion, closing a portion of the preform that becomes the bottom of the bottle by pinch-off and, thereafter, blowing the compressed air or the like into the preform.

The plastic container of the present invention features excellent gradating decoration, has very high commercial value, and can be used as a container for containing various kinds of solutions such as shampoo, rinse and the like.

EXAMPLES

The invention will now be described by way of the following Experimental Examples to which only, however, the invention is in no way limited.

Experiment 1

A plastic container having the layer constitution shown in FIG. 1 was produced in a manner as described below.

The layer constitution was, from the outer surface and in this order, (1) the outer surface layer 3a, (2) the gradation layer 3c, (3) the transparent adhesive resin layer 3b, (4) the colored reproduced layer 1b, and (5) the virgin layer 1a. The extruders of the resins for forming the layers were numbered as 3a, 3c, 3b, 1b and 1a being corresponded to the layers.

The following resin materials were used for forming the layers.

(1) Resin material for forming the outer surface layer 3a:

A copolymerized polyethylene terephthalate resin (PET) of the type of transparent amorphous cyclohexanedimethanol (CHDM) having an intrinsic viscosity of 0.7 dl/g and a water content of 750 ppm.

(2) Resin material for forming the gradation layer 3c:

A copolymerized polyethylene terephthalate resin (PET) of the type of transparent amorphous cyclohexanedimethanol (CHDM) having an intrinsic viscosity of 0.7 dl/g and a water content of 250 ppm, blended with 25% by weight of a mica pigment.

(3) Resin material for forming the transparent adhesive resin layer 3b:

A transparent and colorless low-density polyethylene resin (LDPE) having a melt flow rate (MFR) of 1.5 (g/10 min.) blended with a petroleum resin, and serving as a tackifier.

(4) Resin material for forming the colored reproduced layer 1b:

A mixture of 70% by weight of the scrap resin produced informing the plastic containers and 30% by weight of a virgin high-density polyethylene resin (HDPE), to which Pearl Red which is a bright pigment (mica type pigment having an average particle size of 21 μm) was added in such an amount that the concentration thereof was 0.5% by weight in the whole colored produced layer.

(5) Resin material for forming the virgin layer 1a:

A high-density polyethylene resin (HDPE) blended with no coloring agent. The copolymerized polyethylene terephthalate resin used for forming the outer surface layer 3a and the gradation layer 3c was adjusted to possess a predetermined water content by means of drying at a temperature of 70° C. before it was melted. The water content was measured by the Karl-Fischer method.

By using the resin materials for forming the above layers, a tubular multi-layer parison (multi-layer preform) was formed. That is, the resin material for forming the outer surface layer 3a was fed into an extruder 3a having a caliber of 30 mm, the resin material for forming the gradation layer 3c was fed into an extruder 3c having a caliber of 30 mm, the resin material for forming the transparent adhesive resin layer 3b was fed into an extruder 3b having a caliber of 40 mm, the resin material for forming the colored reproduced layer 1b was fed into an extruder 1b having a caliber of 55 mm, and the resin material for forming the virgin layer 1a was fed into an extruder 1a having a caliber of 40 mm. The resin materials were extruded through a multi-layer head while being heated, plasticized and kneaded to thereby form the tubular multi-layer parison (multi-layer pre form).

Next, the parison was held by a mold having a cavity, and the compressed air was blown therein to prepare, by the direct-blow forming, a cylindrical hollow plastic container having an overall height of 160 mm, outer diameter of 50 mm, side wall height of 110 mm and a capacity of 200 ml.

During the preparation, the thicknesses of the layers were adjusted by adjusting the amount of extrusion by the gear pumps. The mold that was used had an inner surface roughness Ra of 0.6 μm.

The gradation layer 3c had a thickness maintained constant up to a distance of 20 mm from the bottom, had its thickness that started to gradually decrease from the distance of 20 mm up to a distance of 80 mm, and had the zero thickness over the distance of 80 mm. In forming the gradation layer 3c, the amount of extrusion of the resin material for forming the gradation layer 3c was gradually squeezed in the region X where the thickness of the gradation layer 3c varies, and the amount of extrusion of the material for forming the colored reproduced layer 1b was gradually increased corresponding thereto while the amounts of extrusion of the virgin layer 1a, outer surface layer 3a and transparent adhesive resin layer 3b were maintained constant.

The thicknesses of the layers of the body portion of the container were such that the thickness of the body portion of the container was 800 μm constant, the outer surface layer 3a was 40 μm, the transparent adhesive resin layer 3b was 60 m, the virgin layer 1a was 120 m, the gradation layer 3c was 150 μm from the bottom up to the distance of 20 mm, and was 0 μm over the distance of 80 mm, and being corresponded thereto, the colored reproduced layer 1b was 430 μm from the bottom up to the distance of 20 mm, and 580 μm over the distance of 80 mm. In the region X where the thicknesses of the gradation layer 3c and the colored reproduced layer 1b vary, their thicknesses were varied at a predetermined rate.

The obtained plastic containers were evaluated as described below. Table 1 shows their results together with the specifications of the containers.

(Luster)

The obtained plastic containers were evaluated with the eye for their luster on the body portions on the following basis. The results were as shown in Table 1.

◯: Good.

Δ: Partly rugged but allowable.

X: Very rugged on the whole surfaces.

(Gradation)

The obtained plastic containers were evaluated with the eye on the gradation portions on the following basis. The results were as shown in Table 1.

◯: Good.

Δ: Gradation pattern was partly irregular but was allowable.

X: Gradation pattern was not formed.

(Peeling)

The obtained plastic containers were once pushed back (squeezed) on the body portions, and the pushed-back portions were evaluated with the eye on the following basis. The results were as shown in Table 1.

◯: Good.

X: Peeled.

(Productivity)

In producing the plastic containers, the resin pellets for forming the outer surface layer and the gradation layer were dried so as to possess predetermined water contents before being extruded. The times required for the two layers to acquire predetermined water contents were regarded to be related to the productivities and were evaluated on the following basis. The results were as shown in Table 1.

◯: Drying time was less than 10 hours.

Δ: Drying time was not less than 10 hours but was less than 20 hours.

X: Drying time was not less than 20 hours.

Experiment 2

A plastic container was produced in the same manner as in Experiment 1 but setting the water content of the resin material for forming the outer surface layer 1a to be 1500 ppm, and was evaluated in the same manner as in Experiment 1. The specifications of the container and the evaluated results were as shown in Table 1.

Experiment 3

A plastic container was produced in the same manner as in Experiment 1 but setting the water content of the resin material for forming the outer surface layer to be 500 ppm, and was evaluated in the same manner as in Experiment 1. The specifications of the container and the evaluated results were as shown in Table 1.

Experiment 4

A plastic container was produced in the same manner as in Experiment 1 but setting the water content of the resin material for forming the gradation layer to be 500 ppm, and was evaluated in the same manner as in Experiment 1. The specifications of the container and the evaluated results were as shown in Table 1.

Experiment 5

A plastic container was produced in the same manner as in Experiment 1 but setting the water content of the resin material for forming the gradation layer to be 50 ppm, and was evaluated in the same manner as in Experiment 1. The specifications of the container and the evaluated results were as shown in Table 1.

(Reference 1)

A plastic container was produced in the same manner as in Experiment 1 but forming no transparent adhesive resin layer, and was evaluated in the same manner as in Experiment 1. The specifications of the container and the evaluated results were as shown in Table 1.

(Reference 2)

A plastic container was produced in the same manner as in Experiment 1 but using a high-density polyethylene resin as the resin material for forming the outer surface layer and the gradation layer, and forming no transparent adhesive resin layer. The plastic container was evaluated in the same manner as in Experiment 1. The specifications of the container and the evaluated results were as shown in Table 1.

As a result, the luster was poor. Neither the resin forming the outer surface layer nor the resin forming the gradation layer were dried, and the water contents were not measured.

DESCRIPTION OF REFERENCE NUMERALS

1: container body
1a: virgin layer
1b: colored reproduced layer
3: decorative layer
3a: outer surface layer (transparent polyester resin layer)
3b: transparent adhesive resin layer
3c: gradation layer
10: container

The invention claimed is:
1. A plastic container comprising a container body made from an olefin resin and is colored and a decorative layer laminated on the outer surface of the container body, wherein
said decorative layer includes a transparent adhesive resin layer positioned on the inner surface side of the container, a transparent polyester resin layer which is the outer surface layer positioned on the outer surface side of the container, and a gradation layer which is formed between the transparent adhesive resin layer and the transparent polyester resin layer and includes a portion of which the thickness gradually varies in the direction of height of the container, said gradation layer being formed of a resin composition of a transparent polyester resin blended with a coloring agent;
the thickness of the container body in said container body portion varying in response to a change in the thickness of said gradation layer in a manner that the thickness of the container body portion which is the total thickness of the thickness of said container body and the thickness of said decorative layer is not varied by the presence of said gradation layer; and
the water content of the transparent polyester resin forming the gradation layer is smaller than the water content of the transparent polyester resin forming the outer surface layer, the water content of the transparent polyester resin forming the outer surface layer is in a range of 500 to 1500 ppm, and the water content of the transparent polyester resin forming the gradation layer is in a range of 50 to 500 ppm.
2. The plastic container according to claim 1, wherein said container body includes an uncolored or colored layer of a virgin olefin resin, and a colored reproduced layer formed by using scraps that generates at the time of forming the

TABLE 1

| | Specifications of the container | | | | Evaluation | | | |
|---|---|---|---|---|---|---|---|---|
| | Outer surface layer (water content ppm) | Gradation layer (water content ppm) | Adhesive layer | Main body | Luster | Gradation | Peeling | Productivity |
| Experiment | | | | | | | | |
| 1 | PET(750) | PET(250) | LDPE | HDPE | ○ | ○ | ○ | ○ |
| 2 | PET(1500) | PET(250) | LDPE | HDPE | Δ | ○ | ○ | ○ |
| 3 | PET(500) | PET(250) | LDPE | HDPE | Δ | ○ | ○ | ○ |
| 4 | PET(750) | PET(500) | LDPE | HDPE | ○ | Δ | ○ | ○ |
| 5 | PET(750) | PET(50) | LDPE | HDPE | ○ | ○ | ○ | Δ |
| Reference | | | | | | | | |
| 1 | PET(750) | PET(250) | none | HDPE | ○ | ○ | X | ○ |
| 2 | HDPE | HDPE | none | HDPE | X | ○ | ○ | — | containers being blended with an olefin resin and a coloring agent, the thickness of said colored reproduced layer varying responsive to a change in the thickness of the gradation layer.

3. The plastic container according to claim 1, wherein the plastic container is a bottle obtained by the direct blow-forming.

\* \* \* \* \*